United States Patent
Kim (10) Patent No.: US 7,756,344 B2
(45) Date of Patent: Jul. 13, 2010

(54) SYSTEM FOR DISPLAYING CHARACTER AND A METHOD THEREOF

(75) Inventor: Young-sang Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 11/152,158

(22) Filed: Jun. 15, 2005

(65) Prior Publication Data

US 2005/0276490 A1     Dec. 15, 2005

(30) Foreign Application Priority Data

Jun. 15, 2004   (KR) ...................... 10-2004-0043923

(51) Int. Cl.
G06K 9/36 (2006.01)
(52) U.S. Cl. ...................................... 382/232
(58) Field of Classification Search ......... 382/232–251; 725/32–36, 135–139, 100, 400, 143–153; 380/201–217; 375/240.01–240.28; 348/468; 370/537

See application file for complete search history.

(56) References Cited

U.S. PATENT DOCUMENTS 5,510,849 A    4/1996   Han
(Continued)

FOREIGN PATENT DOCUMENTS

KR        2003-0014816    *   2/2003
(Continued)

OTHER PUBLICATIONS

G. Forbes, "Closed Captioning Transmission and Display in Digital Television", This paper appears in: Digital and Computational Video, 2001, Proceedings. Second International Workshop on Publication Date: Feb. 8-9, 2001, pp. 126-131.

*Primary Examiner*—Sherali Ishrat
(74) *Attorney, Agent, or Firm*—Sughrue Mion, PLLC (57) ABSTRACT

Disclosed are an image processing system for displaying character information and a method for the same. According to the image processing system, character information is input by a user, and the input character information is combined with received image and audio signals to generate Transport Streams (TSs), which are transmitted to an image display. The image display decodes and outputs the received TSs. Accordingly, when it is necessary to inform urgent public notices within a predetermined region such as a public place, these notices may be rapidly transmitted to be displayed as character information.

17 Claims, 5 Drawing Sheets

U.S. PATENT DOCUMENTS

| | | | |
|---|---|---|---|
| 5,627,691 A * | 5/1997 | Hong | 386/95 |
| 5,742,352 A | 4/1998 | Tsukagoshi | |
| 5,790,115 A * | 8/1998 | Pleyer et al. | 715/716 |
| 5,801,782 A * | 9/1998 | Patterson | 348/473 |
| 5,907,366 A | 5/1999 | Farmer et al. | |
| 5,995,709 A | 11/1999 | Tsuge | |
| 6,061,451 A * | 5/2000 | Muratani et al. | 380/201 |
| 6,415,100 B1 * | 7/2002 | Park | 386/95 |
| 6,816,201 B1 * | 11/2004 | Fang et al. | 348/468 |
| 6,928,165 B1 * | 8/2005 | Takai | 380/201 |
| 7,061,942 B2 * | 6/2006 | Noronha et al. | 370/537 |
| 7,146,094 B1 * | 12/2006 | Boyle | 386/95 |
| 2001/0008575 A1 * | 7/2001 | Rho et al. | 386/69 |
| 2002/0059589 A1 * | 5/2002 | Park | 725/35 |
| 2002/0076245 A1 * | 6/2002 | Aiyama | 400/61 |
| 2002/0094025 A1 * | 7/2002 | Hanamura et al. | 375/240.01 |
| 2003/0133042 A1 * | 7/2003 | Lee et al. | 348/468 |
| 2003/0169369 A1 | 9/2003 | Kahn | |
| 2003/0169579 A1 * | 9/2003 | Larson et al. | 361/796 |
| 2003/0225509 A1 * | 12/2003 | Okamoto | 701/201 |
| 2005/0013584 A1 * | 1/2005 | Takaoka et al. | 386/46 |
| 2005/0259754 A1 * | 11/2005 | Ho et al. | 375/240.28 |

FOREIGN PATENT DOCUMENTS

| | | |
|---|---|---|
| KR | 2003-0014816 A | 2/2003 |
| WO | 02/32122 A1 | 4/2002 |

* cited by examiner

| ㄱ | ㄴ | ㄷ | ㄹ | ····· |
|---|---|---|---|---|
|   |   |   |   |   |
|   |   |   |   |   |
|   |   |   |   |   |
|   |   |   |   |   |
| ㅏ | ㅑ | ㅓ | ㅕ | ····· |
|   |   |   |   |   |

FIG. 5B

| A | B | C | ····· |   |   |
|---|---|---|---|---|---|
|   |   |   |   |   |   |
|   |   |   | ····· |   |   |
|   |   |   | ····· | Y | Z |

FIG. 6

SYSTEM FOR DISPLAYING CHARACTER AND A METHOD THEREOF

CROSS-REFERENCE TO RELATED APPLICATIONS

This application claims benefit under 35 U.S.C. §119 from Korean Patent Application No. 2004-43923, filed on Jun. 15, 2004, the entire content of which is incorporated herein by reference.

BACKGROUND OF THE INVENTION

1. Field of the Invention

The present invention relates to an image processing system capable of displaying character information along with image and audio signals input through a set-top box in an image display, and a method for the same.

2. Description of the Related Art

Due to the development of data compression and transmission techniques, image processing systems capable of displaying image and audio data through wireless and wired interconnections are widely utilized. One example of such image processing systems includes a system combined with a set-top box which provides images as data streams in accordance with a Moving Picture Expert Group (MPEG) standard and an image display which displays the received data streams. MPEG standards are used as standards for compressing and transmitting moving pictures and MPEG standards such as MPEG 1, 2, and 4 are utilized or proposed. Very high compression effectiveness may be obtained by means of the MPEG standards, which allow images to be transmitted at a very low bit rate. Accordingly, MPEG standards are widely utilized in compressing the received image and audio signals in devices such as a set-top box.

Figure 1:
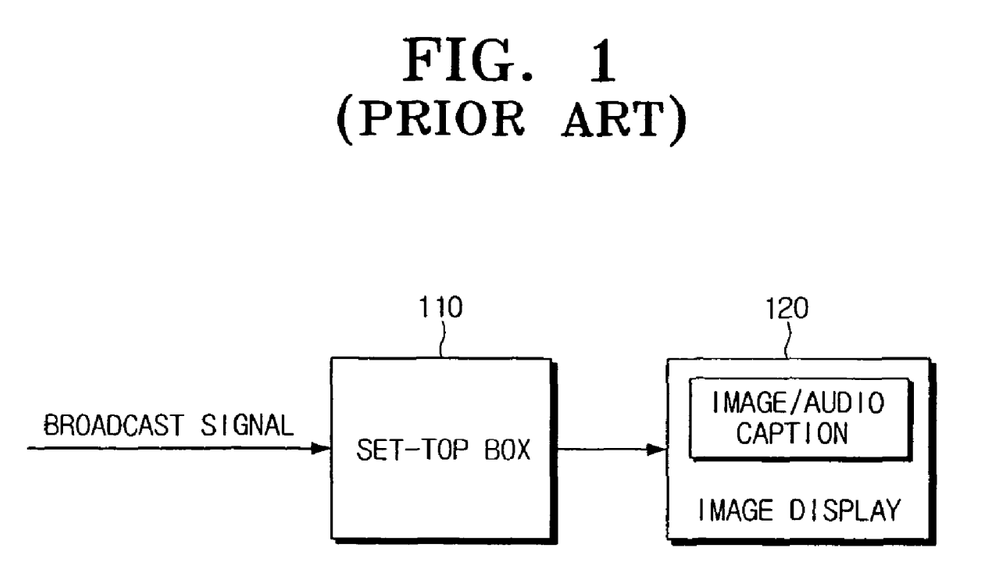
FIG. 1 is a diagram for showing one example of a conventional image processing system.

FIG. 1 shows one example of conventional image processing systems combined with a set-top box and an image display. Referring to FIG. 1, the set-top box 110 receives, compresses, and transmits broadcast signals to the image display 120, which in turn decodes and outputs the broadcast signals. The broadcast signals are provided, for example, through an antenna or by cables or wired broadcast providers. When it is required to include character information in the broadcast signals, a broadcast station inserts the characters or simple graphics into the broadcast signals to be emitted and transmits them. In other words, the character information is inserted into the broadcast signals when it is required to inform all receivers of the broadcast signals such as news, forecast information, and traffic information.

In general, a caption broadcast including character information may be classified into an open caption type and a closed caption type based on a manner of displaying the characters on a screen. The open caption type allows anyone to see characters inserted into content such as news, video, movie, and so forth. On the other hand, the closed caption type can have characters seen or not seen which have been input to some of TV scan lines through electric waves and processed by a decoder. In addition, the caption broadcast may be classified into an on-line service and an off-line service. The on-line service allows a live broadcast to be written in shorthand in real time and output, and the off-line service outputs contents in response to a broadcast in progress by inserting captions into recorded tapes or inputting data such as scripts in advance.

However, when urgent situations happen at government and public offices and public places such as train stations or terminals, there exists a limitation in a conventional image processing system that informs people at the public places of the urgent situation. In other words, character information is transmitted to all service areas of the broadcast, so that it is not suitable for transmitting the character information to small areas. In addition, there is a limitation on transmitting character information in real time, because the subject that transmits the character information is not a manager of the government or public offices but the broadcast station, and it should input the character information using specific equipment, which in turn limits character information required to be input at a fast speed.

SUMMARY OF THE INVENTION

It is, therefore, one aspect of the present invention to provide an image processing system which displays character information on an image display connected to a set-top box in real time when the character information is input through the set-top box in a simple manner, and to provide a method for the same.

In order to achieve an aspect of the present invention, there is provided an image processing system, which comprises a character information input unit for receiving the character information; a signal input unit for receiving image and audio signals; a Moving Picture Expert Group (MPEG) encoder for combining the character information with the image and audio signals to generate Transport Streams (TSs); and a transmission unit for transmitting the TSs to the image display.

The image display includes a receiving unit for receiving the TSs, an MPEG decoder for decoding the received TSs; and an output unit for outputting the TSs decoded in the MPEG decoder.

In this case, the output unit may be, for example a Plasma Display Panel (PDP) or a Liquid Crystal Display (LCD).

The MPEG encoder may preferably, but not necessarily, include a closed caption unit for converting the character information to closed caption formats; and a TS port for combining the character information converted to the closed caption formats with the image and audio signals to generate the TSs. Furthermore, the character information input unit may transmit the character information to the MPEG encoder using, for example, an I2C bus or a Universal Asynchronous Receiver/Transmitter UART.

Preferably, but not necessarily, the image processing system may further comprise a character display unit for displaying the input character information, wherein the character information may be input through a remote controller referring to the character information displayed on the character display unit.

The character information input unit, the signal input unit, the MPEG encoder, and the transmission unit may be included in a set-top box, and the transmission unit may transmit the TSs under an Institute of Electrical and Electronics Engineers (IEEE) 802.11a standard protocol.

In the meantime, a method for displaying character information in an image processing system comprises receiving image and audio signals; receiving the character information; combining the character information with the image and audio signals to generate Transport Streams (TSs); and transmitting the TS streams to an image display. Preferably, but not necessarily, the method may further comprise receiving and decoding the TSs; and outputting the decoded TSs.

Generating the TSs may include converting the character information to closed caption formats and combining the converted character information with the image and audio signals to generate the TSs. In addition, receiving the character information may include receiving the character information through a remote controller. Transmitting the TSs may include transmitting the TSs under an IEEE802.11a standard protocol.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF THE PREFERRED EMBODIMENTS

Hereinafter, the present invention will be described in detail with reference to illustrative accompanying drawings.

Figure 2:
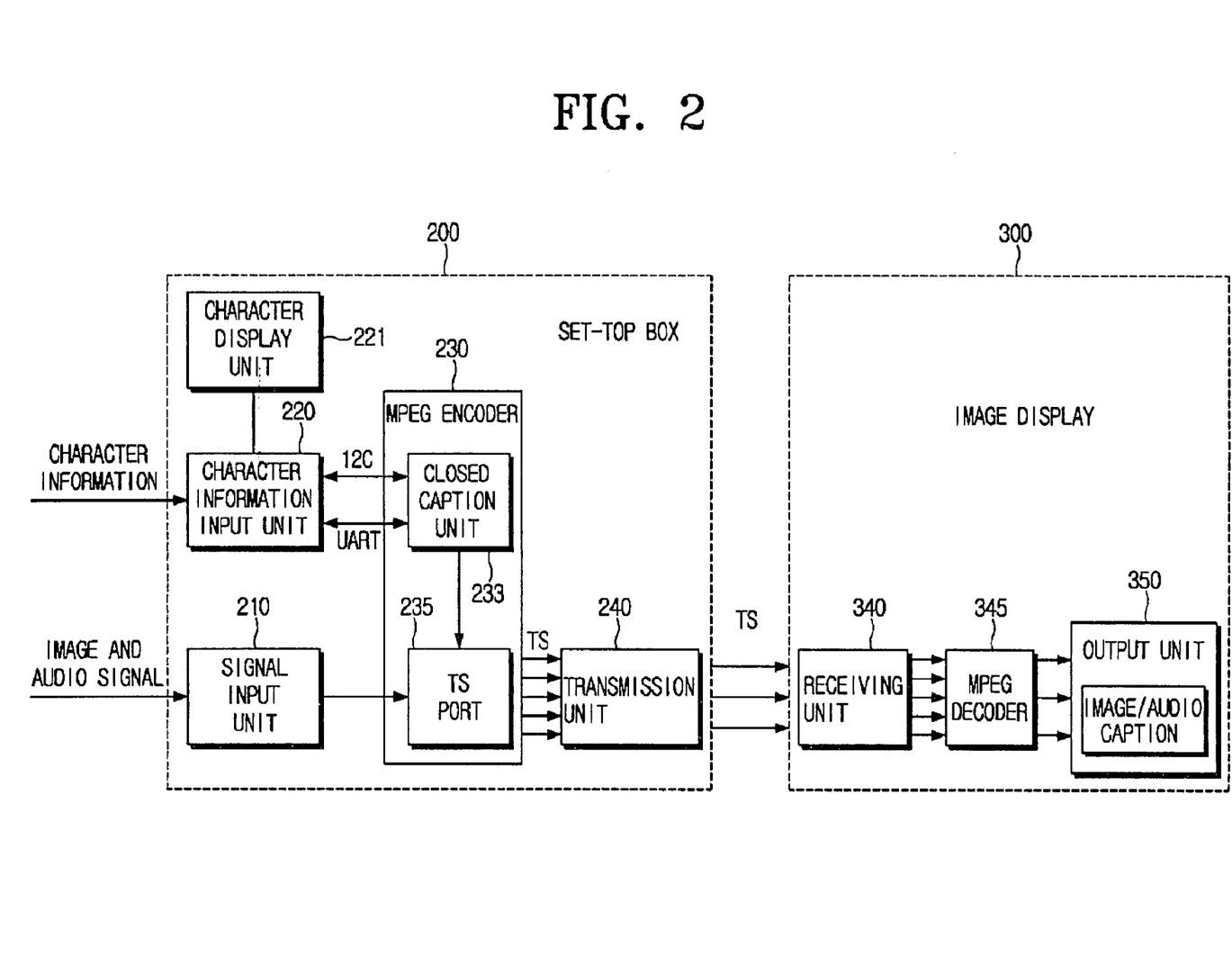
FIG. 2 is a block diagram of an image processing system in accordance with one embodiment of the present invention.

FIG. 2 is a block diagram of an image processing system in accordance with one embodiment of the present invention. Referring to FIG. 2, the image processing system for displaying character information in accordance with an embodiment of the present invention comprises a set-top box 200 and an image display 300. The set-top box 200 comprises a signal input unit 210, a character information input unit 220, a character display unit 221, an MPEG encoder 230, and a transmission unit 240. The MPEG encoder 230 has a closed caption unit 233 and a TS port 235. The image display 300 comprises a receiving module 340, an MPEG decoder 345, and an output unit 350.

Character information is input to the set-top box 200 by a user. Input character information is combined with image and audio signals to generate Transport Streams (TSs). In this case, the image and audio signals to be combined are input through the signal input unit 210. The image and audio signals may be signals input through terrestrial broadcast signals or signals input through cables, or may be signals input from external equipment such as a Digital Versatile Disk (DVD).

Figure 3:
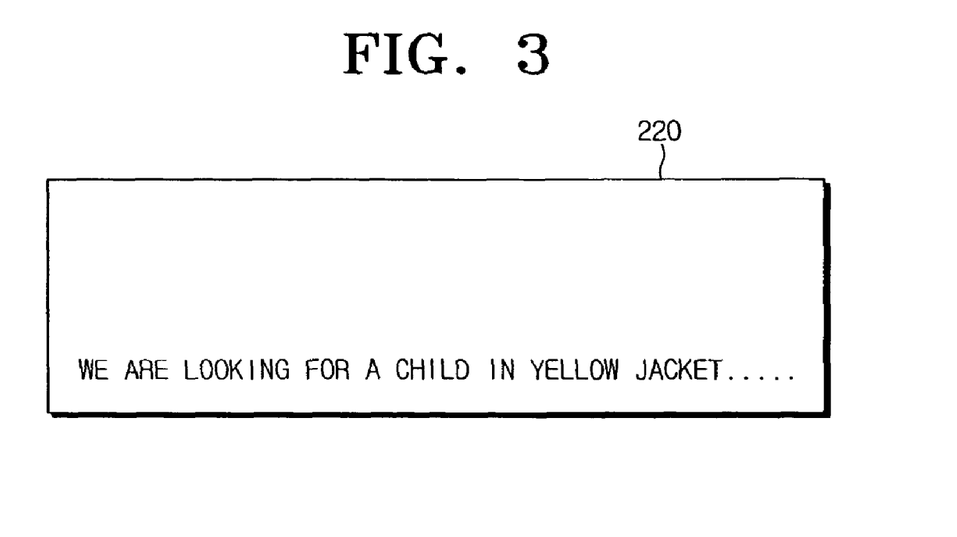
FIG. 3 is a diagram for showing an example of character information to be input to a set-top box shown in FIG. 2.

FIG. 3 is a diagram showing an example of character information to be input to the set-top box shown in FIG. 2. Referring to FIG. 3, character information displaying "We are looking for a child in yellow jacket . . ." are shown. In other words, when it is necessary to inform urgent public notices including a lost child in a public place such as a train station, the character information may be input through the set-top box 200 and transmitted as character information to the image display installed in the public place.

Figure 4:
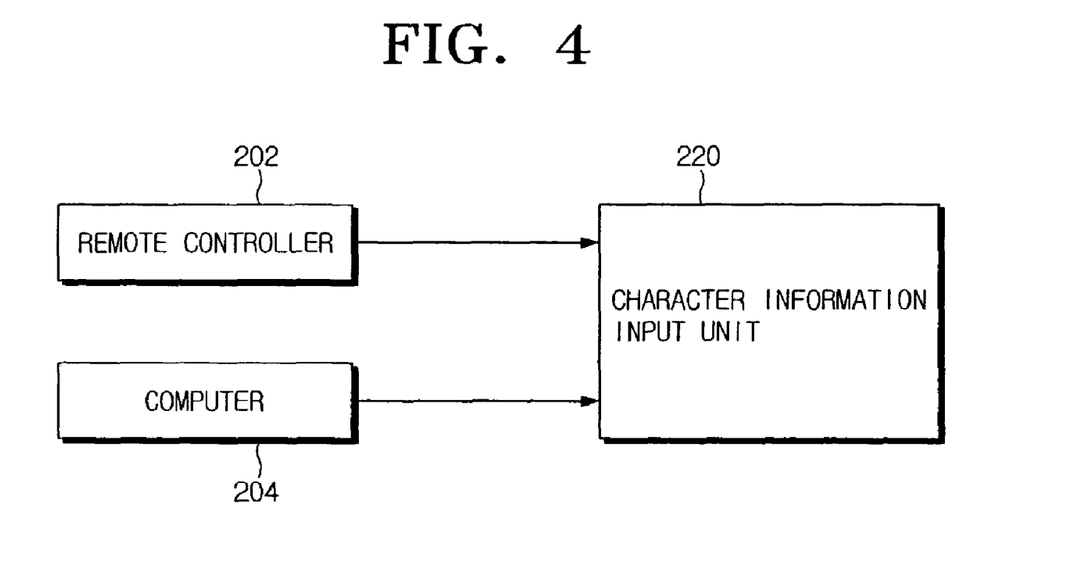
FIG. 4 is a diagram for showing an example of a unit for inputting character information to a set-top box shown in FIG. 2.

FIG. 4 is a diagram for showing an example of a unit for inputting character information to the set-top box shown in FIG. 2. Referring to FIG. 4, a remote controller 202 and a computer 204 are shown as units for inputting the character information. When the computer 204 is employed, required character information may be readily input through a keyboard.

Figure 5A:
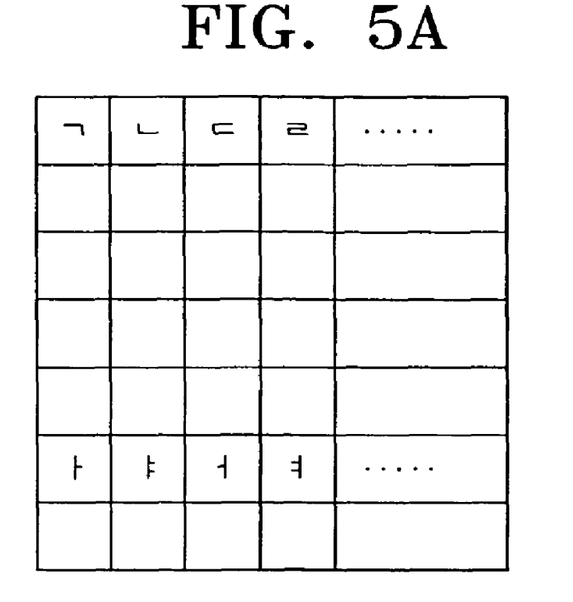
FIGS. 5A and 5B are diagrams for showing examples of character tables used when the character information is input using a remote controller.
Figure 5B:
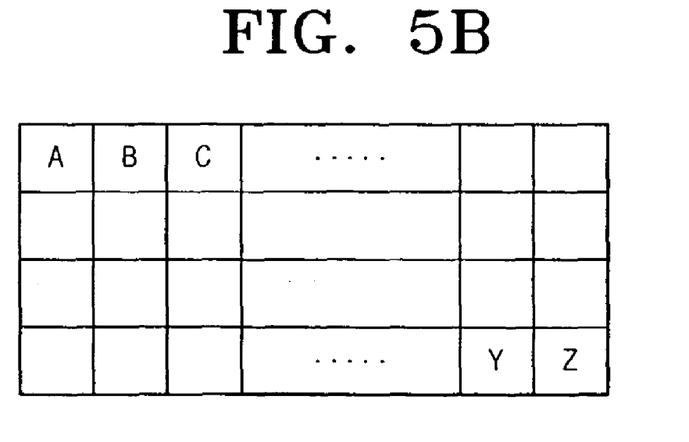

FIGS. 5A and 5B are diagrams showing examples of character tables used when the character information is input using the remote controller 202 of FIG. 4. Referring to FIG. 5A, consonants and vowels of the Korean language are shown, and letters of the alphabet are shown in FIG. 5B. These character tables are exemplary and may be varied to be character and number tables to serve users' convenience. The character tables may be included in the character display unit 221 of the set-top box 200. Users control the remote controller to display character information stored in the character tables in the character display unit 221 and select required characters. Such method allows characters, which need to be transmitted as shown in FIG. 3, to be input.

Character information input through the character information input unit 220 are delivered to the MPEG encoder 230 through a Universal Asynchronous Receiver/Transmitter (UART) or an I2C bus. In this case, the character information is delivered on a predetermined unit basis, for example, on a 1 byte unit basis. Character information input to the MPEG encoder 230 are converted to closed caption formats in the closed caption unit 233. The character information converted to the closed caption formats are combined with image and audio signals transmitted from the signal input unit 210 in the TS port 235 so that they are generated as TSs. In other words, they are converted to DTV streams that have closed captions. The transmission unit 240 transmits the generated TSs. In this case, transmission may be carried out in a wired manner or a wireless manner, and a predetermined standard is constantly employed when the wireless manner is selected, and one example thereof is the IEEE802.11a. The IEEE802.11a is one of the standards established by the Institute of Electrical and Electronics Engineers (IEEE) for a wireless Local Area Network (LAN).

The image display 300 receives and decodes TSs transmitted from the set-top box 200, and outputs character information with image and audio signals. TSs transmitted from one set-top box 200 may be received by several image displays 300 to be output. In this case, character information is advantageously input by one set-top box 200 and transmitted to the several image displays 300 at the same time. The image display 300 receives TSs through the receiving unit 340. The input TSs are delivered to the MPEG decoder 345 and decoded as character information, image and audio signals. Decoded character information, image and audio signals are output through the output unit 350. The character information may be displayed through the output unit 350 in real time as various forms such as cc1, cc2, service1, text1, and so forth.

A Plasma Display Panel (PDP) or a Liquid Crystal Display (LCD) may be employed for the output unit 350. In recent years, LCD and PDP have been introduced which have overcome problems resulting from a cathode ray tube that requires a high consumption power and a large volume. LCD and PDP are good at large-scale implementation and have a fast response speed, and facilitate a large screen and a thin-scale implementation.

Figure 6:
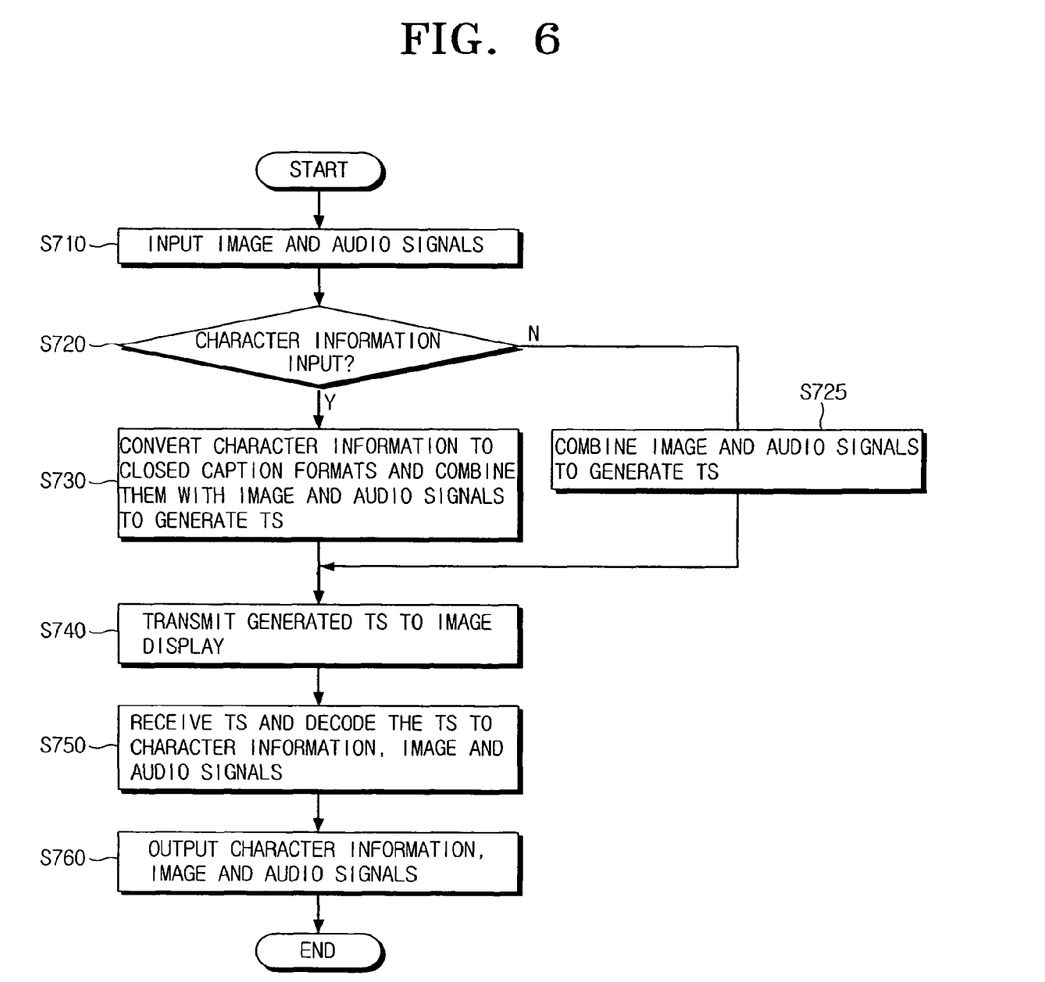
FIG. 6 is a flowchart for explaining a method for displaying character information in an image processing system in accordance with the present invention.

FIG. 6 is a flowchart showing a method for displaying character information in an image processing system in accordance with the present invention. The method for displaying character information will be described with reference to FIG. 2 and FIG. 6. Image and audio signals are input to the set-top box 200 through the signal input unit 210 (S710). It is then determined whether the character information is input to the set-top box 200 (S720). When it is determined that the character information is not input at S720, the MPEG encoder 230 combines image and audio signals to generate TSs (S725).

When it is determined that the character information is input at S720, the character information is converted to closed caption formats in the closed caption unit 233, which are combined with the image and audio signals in the TS port 235 to generate TSs (S730). The character information may be input using the remote controller while referring to tables in which the Korean language, the alphabet, numbers, and specific characters are displayed on an On Screen Display (OSD). Generated TSs are transmitted from the set-top box 200 to the image display 300 (S740). They may be preferably, but not necessarily, transmitted to several image displays 300 in a wireless manner.

The receiving unit 340 of the image display 300 receives TSs transmitted from the set-top box 200, and delivers them to the MPEG decoder 345, which in turn decodes them to received character information, image and audio signals (S750). Decoded character information, image and audio signals are output through the output unit 350, wherein the character information may be displayed in various caption formats. Accordingly, character information input through the set-top box may be output to the image display.

As mentioned above, when it is necessary to inform urgent public notices in a public place, character information may be input to the set-top box and output to the image display installed in the public place in accordance with the present invention. Furthermore, colors, fonts, and so forth may be adjusted to allow required character information to be delivered in various forms even when the image display is broadcasting.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art. For example, although embodiments using an MPEG standard have been described, the invention is not limited to the use of an MPEG standard. Any video scheme that allows combining character information with image information could be used.

What is claimed is:

1. An image processing system, comprising:
   a character input unit that transmits a first signal, the character input unit comprising a remote controller, and
   a set-top box, the set-top box comprising:
     a character information input unit that receives the first signal from the remote controller, and generates character information based on the received first signal;
     a signal input unit that receives a second signal from an external source, the second signal including audio or image information;
     a closed caption unit that converts the character information to closed caption formats;
     an encoder that combines the character information of the closed caption formats with the second signal to generate a multiplexed signal; and
     a transmission unit that transmits the multiplexed signal to an image display.

2. The image processing system as recited in claim 1, wherein the second signal is an audio signal and an image signal, the encoder is a Motion Picture Expert Group (MPEG) encoder that combines the character information with the image signal and the audio signal to generate the multiplexed signal, and the multiplexed signal comprises a Transport Stream (TS).

3. The image processing system as recited in claim 1, wherein the image display comprises:
   a receiving unit that receives the multiplexed signal, a decoder that decodes the received multiplexed signal to generate a decoded signal; and
   an output unit that outputs the decoded signal.

4. The image processing system as recited in claim 3, wherein the second signal is an audio signal and an image signal, the encoder is a Motion Picture Expert Group (MPEG) encoder that combines the character information with the image signal and the audio signal to generate the multiplexed signal, and the multiplexed signal comprises a Transport Stream (TS), and the decoder is an MPEG decoder.

5. The image processing system as recited in claim 4, wherein the image display comprises a plurality of displays.

6. The image processing system as recited in claim 4, wherein the output unit is one of a Plasma Display Panel (PDP) and a Liquid Crystal Display (LCD).

7. The image processing system as recited in claim 2, wherein the MPEG encoder comprises:
   a TS port that combines the character information converted to the closed caption formats with the image signal and the audio signal to generate the TS.

8. The image processing system as recited in claim 2, wherein the character information input unit transmits the character information to the MPEG encoder using one of an I2C bus and a Universal Asynchronous Receiver/Transmitter (UART).

9. The image processing system as recited in claim 1, further comprising:
   a character display unit for displaying the generated character information,
   wherein the character information is displayed on the character display unit.

10. The image processing system as recited in claim 2, wherein the TS is transmitted under an Institute of Electrical and Electronics Engineers (IEEE) 802.11a standard protocol.

11. A method for displaying character information in an image processing system, comprising:
    transmitting, by a character input unit a first signal, the character input unit comprising a remote controller;
    using a set-top box including a processor to perform:
      receiving the first signal from the remote controller, and generating character information based on the received first signal;
      receiving a second signal from an external source, the second signal including audio or image information;
      converting the character information to closed caption formats;
      combining the character information of the closed caption formats with the second signal to generate a multiplexed signal; and
      transmitting the multiplexed signal to an image display.

12. The method as recited in claim 11, wherein the multiplexed signal is a Transport Stream (TS).

13. The method as recited in claim 12, further comprising:
    receiving and decoding the TS to generate a decoded signal; and
    outputting the decoded signal.

14. The method as recited in claim 12, wherein the second signal is an image signal, and
   wherein generating the TS comprises converting the character information to closed caption formats and combining the converted character information with the image signal.

15. The method as recited in claim 11, further comprising displaying the converted character information on a display.

16. The method as recited in claim 12, wherein transmitting the TS comprises transmitting the TS under an IEEE 802.11a standard protocol.

17. The method as recited in claim 13, wherein outputting the decoded signal comprises outputting the decoded signal to one of a Plasma Display Panel (PDP) and a Liquid Crystal Display (LCD).

* * * * *